United States Patent [19]
Pan et al.

[11] Patent Number: 5,619,609
[45] Date of Patent: Apr. 8, 1997

[54] FIBEROPTIC SUPPORT CLIP

[75] Inventors: Jing-Jong Pan, Milpitas; Paul S. Jiang, San Jose; Ming Shih, Milpitas; Jian Chen; Li-Hua Wang, both of San Jose, all of Calif.

[73] Assignee: E-Tek Dynamics, Inc., San Jose, Calif.

[21] Appl. No.: 597,449

[22] Filed: Feb. 2, 1996

[51] Int. Cl.⁶ ................................. G02B 6/00
[52] U.S. Cl. ................................. 385/136
[58] Field of Search ...................... 385/136, 147

[56] References Cited

U.S. PATENT DOCUMENTS

| | | | |
|---|---|---|---|
| 4,759,600 | 7/1988 | Caron et al. | 385/72 |
| 4,773,730 | 9/1988 | Sedlmayr | 385/147 X |
| 4,837,768 | 6/1989 | Schmid | 372/36 |
| 4,850,671 | 7/1989 | Finzel | 385/72 X |
| 5,044,719 | 9/1991 | Nakamura | 385/136 X |
| 5,146,532 | 9/1992 | Hodge | 385/136 |
| 5,528,718 | 6/1996 | Ray et al. | 385/136 |
| 5,530,785 | 6/1996 | Sakamoto et al. | 385/136 |

*Primary Examiner*—Akm E. Ullah
*Attorney, Agent, or Firm*—Townsend and Townsend and Crew LLP

[57] ABSTRACT

The present invention provides an improved clip for supporting an end of an optical fiber relative to a mount surface. Typically, a sleeve is disposed over the optical fiber adjacent to its end. The clip comprises a clip body having upper and lower surfaces with a flange disposed adjacent to the lower surface. The flange is affixable to the mount surface, and walls extend from the upper surface of the body to define a channel at which the clip is affixable about the sleeve. Advantageously, when the sleeve is affixed within the channel, the body rigidly couples the sleeve to the flange, thereby avoiding misalignment between the optical fiber and any optical device which is on or supported by the mount surface.

23 Claims, 2 Drawing Sheets

FIBEROPTIC SUPPORT CLIP

BACKGROUND OF THE INVENTION

The present invention is related to the field of optical fiber technology, and more particularly, to optical fiber end support structures.

In fiberoptic networks, light signals are transmitted along optical fibers to transfer information from one location to another. Although the propagation of light signals on optical fibers is analogous to the transmission of electronic data along metal wires, entering a light signal into an optical fiber is somewhat more problematic than the electrical coupling of a wire.

Electrical signals which are sent along a wire naturally propagate to and from equipment which is electrically coupled to that wire. However, a light signal must be accurately entered into or monitored from an optical fiber. Such optical fibers are very small in cross-section, and typically have a fairly narrow acceptance angle within which light entering the fiber must fall in order to propagate along the length of the fiber. Therefore, any system which inputs light into an optical fiber must deliver its light with precise alignment. The input alignment requirements of single-mode optical fibers are particularly stringent, as their core diameters are typically as small as 2 to 10 μm.

In present day optical networks, light signals are typically produced by laser diodes. Typical lasing areas in such diodes are 4μ wide by 0.1μ thick with a wide emission angle, some 12° by 40°, which is much larger than the acceptance angle of the optical fiber. Furthermore, the laser diode output facet must typically be separated from the optical fiber tip (input) in order to avoid damage to both the fiber tip and the laser diode due to thermal expansion. Thus the requirement for alignment accuracy between the laser diode and the optical fiber tip is critically high. Alignment uncertainties should be less than 0.1–0.2μ.

Coupling a laser diode with an optical fiber, sometimes referred to as "pigtailing" a laser diode, often involves rigidly affixing the position and orientation of an end of an optical fiber with an independent support structure or "clip." Fiberoptic end support clips are simple structures which hold the end of the optical fiber in a fixed position relative to some mount surface. Unfortunately, known clips generally provide insufficient rigidity to maintain the precise alignment between the optical fiber and a separately supported laser diode or other optical device. Furthermore, alignment of the optical fiber with the laser diode prior to affixing their relationship can be problematic, particularly where the clip does not easily allow adjustments to the position of the end and orientation of the optical fiber.

For the above reasons, it is desirable to provide improved clips for supporting the end of an optical fiber with a greater rigidity than is available from known optical fiber support structures. It would further be desirable if such clips facilitated the alignment of optical fibers, particularly single-mode optical fibers, with a laser diode or other optical device.

SUMMARY OF THE INVENTION

The present invention provides an improved clip for supporting an end of an optical fiber relative to a mount surface. Typically, a sleeve is disposed around the optical fiber adjacent to one end. The clip comprises a clip body having a lower surface and a flange disposed adjacent thereto. The flange is affixable to the mount surface, and walls extend from the body to define a receptacle which is affixable about the sleeve. Advantageously, when the sleeve is affixed within the receptacle, the body rigidly couples the sleeve to the flange, thereby avoiding misalignment between the optical fiber and any optical device which is also disposed on or supported by the mount surface.

Preferably, the receptacle comprises a channel which fittingly receives the sleeve within a predetermined height range from the lower surface. This facilitates adjustments in the vertical position of the optical fiber before it is affixed to the clip. Ideally, the walls are reduced in thickness adjacent to a plurality of contact points between the sleeve and the channel, thereby facilitating laser welding of the sleeve to the clip. Advantageously, such a clip having a planar lower surface and a flange which is laser weldable to a planar mount surface provides a simple, rigid fiberoptic end support structure which allows precise three-dimensional alignment of the position and orientation of the end of the optical fiber.

In another aspect, the present invention provides a method for supporting an end of an optical fiber, the method comprising affixing the optical fiber in a sleeve, and affixing the sleeve in a receptacle of a clip, the receptacle being defined by walls which extend from a body of the clip. The clip is affixed to a mount surface so that the body of the clip rigidly couples the sleeve to the mount surface.

DETAILED DESCRIPTION OF THE SPECIFIC EMBODIMENTS

Figure 1:
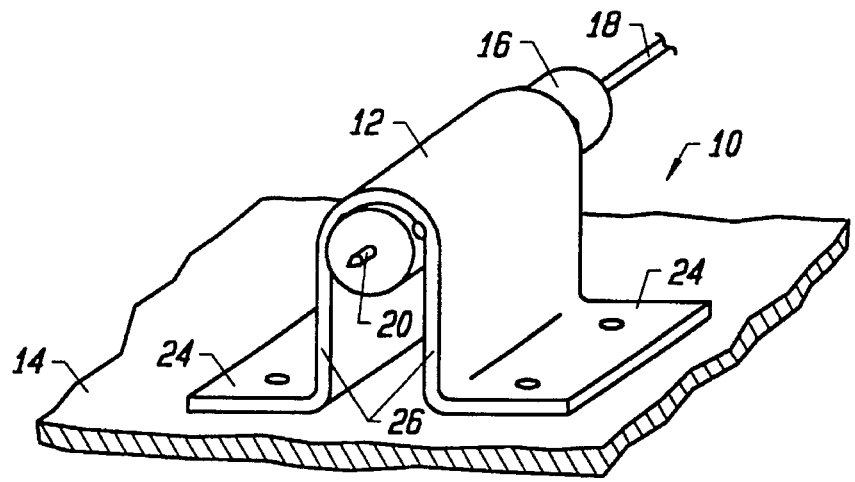
FIGS. 1 and 2 illustrate known fiberoptic end support structures.

FIG. 1 shows a fiberoptic end support system 10 which makes use of a bent clip 12. The clip is affixed to a mounting surface 14 and restrains a sleeve 16 disposed over an optical fiber 18 near an optical fiber end 20. Sleeve 16 is affixed to clip 12, which in turn is affixed to the mounting surface by flanges 24.

Bent clip 12 is generally formed by bending thin sheet metal into an arched shape. As a result, clip walls 26 extend independently from sleeve 16 to the flanges. While the sleeve/clip and clip/mount surface attachments and the arched shape of clip 12 provide some coupling of independent legs 26 at their top and bottom ends, the legs alone couple the sleeve to the mount surface, and relative motion between the sleeve and the mount surface will result if either or both of the two independent legs 26 is flexed or distorted. For these reasons, bent clip 12 is susceptible to loss of the alignment of the end of the optical fiber when it is subjected to the shocks, bumps, and other environmental forces encountered in everyday use.

A further disadvantage of bent clip 12 is the difficulty in maintaining proper alignment of the optical fiber while it is being affixed in place. As described above, bent clip 12 is formed by bending sheet metal to the desired shape. In any such bending operation, residual stresses are imposed in the clip material. While annealing and other techniques are available to lower the amount of induced stress remaining in the clip, it is difficult or even impossible to fully remove all stress induced in such a bending operation. Unfortunately, these induced stresses tend to distort the shape of the clip when a portion of the clip is heated to a high temperature, as occurs in many attaching procedures, including laser welding operations. Hence, an optical fiber which is properly aligned before laser welding begins may move slightly during the laser welding process, or even after the weld when the clip cools. As described above, even small amounts of misalignment of the end 20 of optical fiber 18 are sufficient to degrade the optical acceptance, particularly when using single mode fibers.

Figure 2:
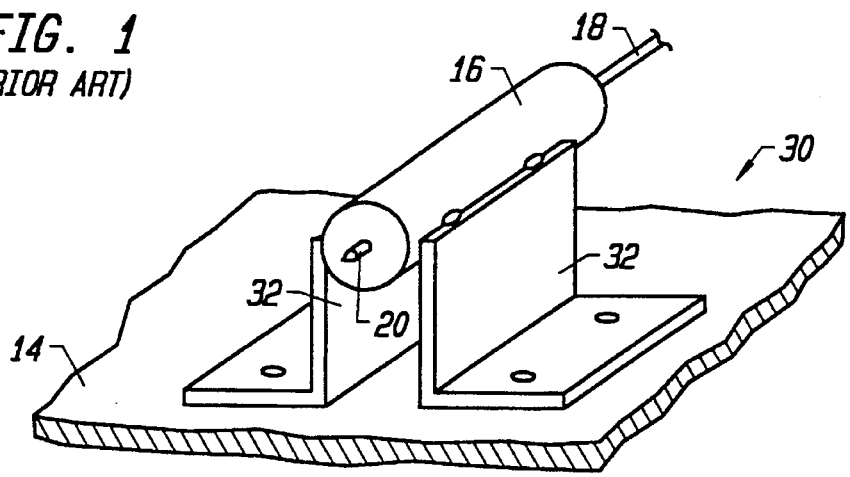

Referring now to FIG. 2, an alternative known fiberoptic end support system 30 comprises two separate angle brackets 32 which are independently affixed to mount surface 14 and to sleeve 16. Although angle brackets 32 may be extruded or machined to avoid the induced stress associated with bent bracket 12, alignment of the end 20 of optical fiber 18 is complicated by the requirement to properly position the fiber relative to each of the separate angle brackets 32. Perhaps even more significant, the angle brackets are coupled together only through the sleeve/clip attachments, which can do little to prevent flexing of the vertical portion of the angle brackets with its accompanying loss of alignment.

Figure 3:
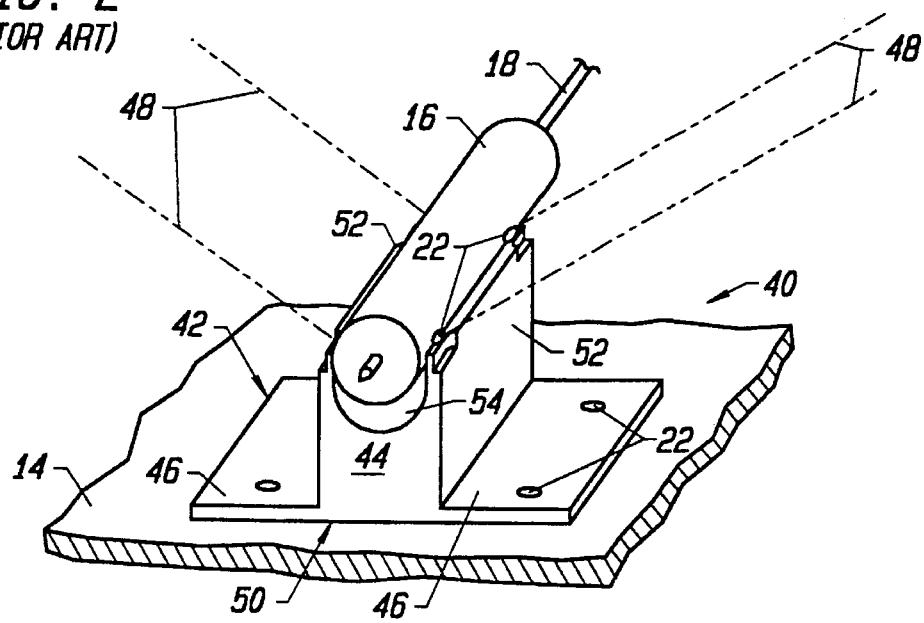
FIG. 3 illustrates a fiberoptic end support structure system, including a fiberoptic end support clip accordingly to the principles of the present invention.

An improved fiberoptic end support system 40 according to the present invention is illustrated in FIG. 3. A rigid clip 42 comprises a central body 44 with a pair of walls 52 which extend upward so as to define a channel 54 therebetween. Preferably, flanges 46 extend from both sides of body 44 adjacent to its lower surface 50. Sleeve 16 is fittingly disposable between walls 52, thereby allowing the optical fiber to be affixed anywhere within a predetermined range of distances from mount surface 14. The sleeve is generally affixed to the clip by laser welds 22, which also affix the flanges to the mount surface. Advantageously, the central body 44 of rigid clip 42 firmly couples the sleeve to the mount surface, thereby avoiding any loss of alignment between the end of the optical fiber and mount surface 14 when the system is subjected to normal environmental stresses.

At least two welds 22 are preferably formed at the two thinned portions of each wall 52 by laser energy. The laser energy is directed toward the clip along paths 48. Laser welding not only attaches the optical fiber sleeve 16 to the clip 42, but the application of laser energy along these paths allows precise adjustment to the alignment of the optical fiber to the laser diode. Laser welding creates local heating in a very short time. Hence a shock wave is created in the combined structure of the sleeve and the clip. By adjusting the paths 48 and the power applied in the laser welding, the laser welding operation is used to "fine tune" the position of the sleeve 16 in the clip 42.

Figure 4:
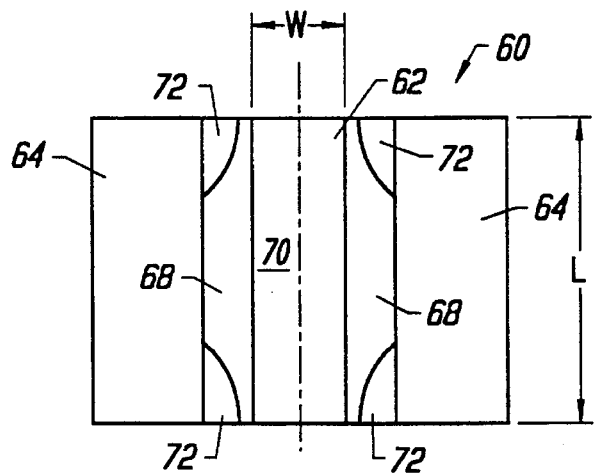
FIGS. 4 and 5 illustrate top and front views of a preferred fiberoptic end support clip according to the principles of the present invention.
Figure 5:
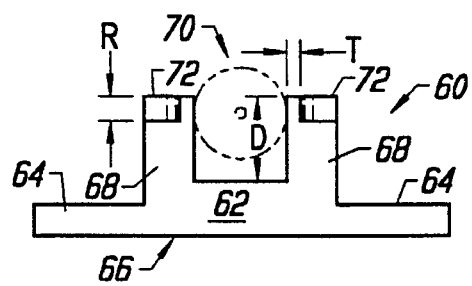

A preferred rigid clip 60 according to the present invention is illustrated in FIGS. 4 and 5. Once again, preferred clip 60 includes a body 62 with flanges 64 extending therefrom adjacent to a bottom surface 66. Walls 68 extend upward from body 62 to define a channel 70, the body and walls defining a generally U-shaped cross-section.

Channel 70 has a width W which closely matches the outer diameter of sleeve 16 (as seen in FIG. 3). This ensures that walls 68 will each be in close proximity to the sleeve when the sleeve is moved upward or downward to obtain the desired vertical alignment of the optical fiber.

Walls 68 of preferred clip 60 further include chamfers 72 which locally reduce the thickness of the wall adjacent channel 70. Advantageously, these chamfers thus produce a wall having a reduced thickness T at selected contact points between the clip and the sleeve. Laser welding of these selected locations is greatly facilitated by this reduction in thickness, while the rigidity of preferred clip 60 benefits from the relatively thick cross-section of the remainder of walls 68.

Channel 70 of preferred clip 60 has a depth D which is greater than the radius of the sleeve which fits therein. Furthermore, chambers 72 have a depth which is greater than that required to affix the sleeve at a single point. Both of these features help to provide a minimum range R within which the optical fiber may be disposed when the sleeve is affixed to the clip. Preferably, this range R is at least as large as the total range of motion of the end of the optical fiber required to provide alignment within the optical fiber support system, and will accommodate the tolerance of the support system structures.

Generally, preferred clip 60 comprises a metal, preferably one which is laser weldable and which has thermal expansion characteristics which are compatible with the optical fiber and mount surface of the device package. Oftentimes, preferred clip 60 will be machined from a high strength alloy such as Kovar, stainless steel, or the like. Such machining avoids imposition of induced stresses during the fabrication process, and the relatively small size of preferred clip 60 requires minimal machining time. In fact, preferred clip 60 will typically have a length L of between 1 and 5 mm. As described above, channel 70 has a width W that corresponds to the diameter of the sleeve which will be received therein, typically being between about 0.4 and 3 mm. Walls 68 will generally be at least 0.2 mm thick, locally reduced by chamfers 72 so that thickness T is between 0.3 and 1.5 mm, so as to facilitate laser welding without raising the temperature of the optical fiber within the sleeve. Flanges 64 should also be of a thickness appropriate for laser welding preferred clip 60 to the mounting surface, typically being between about 0.2 and 1 mm. The body 62 of preferred clip 60 will generally be at least as thick as flanges 64, often being substantially thicker to improve the rigidity of channel 70.

Figure 6:
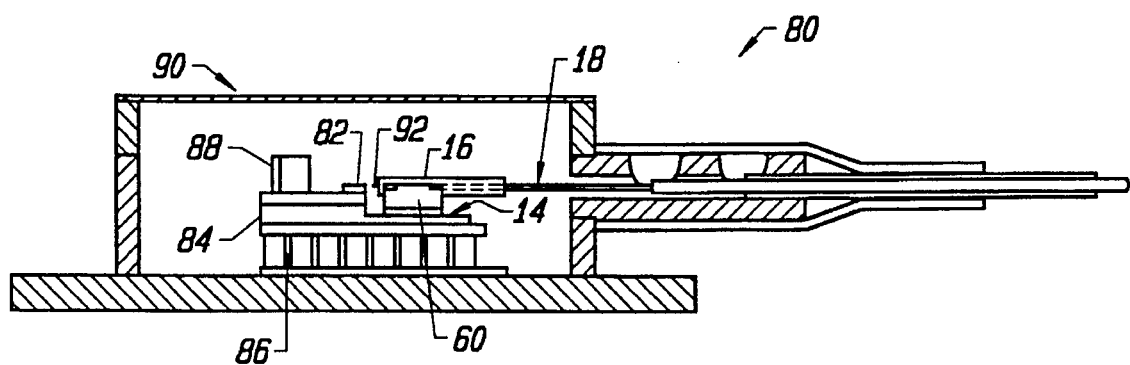
FIG. 6 is a cutaway side view of a laser diode/optical fiber coupling module including the preferred clip of FIGS. 4 and 5.

A particularly advantageous application for preferred clip 60 is shown in FIG. 6. A pigtailed laser diode module 80 includes a laser diode 82 mounted on a heat sink 84. Mount surface 14 is imposed on the heat sink adjacent the emitter of the laser diode. A thermoelectric cooler 86 and a monitoring photodetector 88 are included within a hermetically sealed package 90, as is generally known in the art. As described above, preferred clip 60 rigidly couples the sleeve 16 to the mount surface. As optical fiber 18 is secured within sleeve 16, and as laser diode 82 is also affixed to the heat sink 84 on which the mounting surface is disposed, preferred clip 60 will maintain alignment between the laser diode and the end of the optical fiber.

To promote the admission and propagation of light from the laser diode into optical fiber 18, a microlens 92 is disposed at the end of optical fiber 18 adjacent the laser diode. As more fully explained in U.S. Pat. No. 5,016,963, the full disclosure of which is incorporated herein by reference, such a microlens may be efficiently produced by fusing the end of optical fiber 18 with another optical fiber under heat, and then drawing optical fiber 18 away from the other fiber to produce a tapered shape. Microlens 92 generally increases the efficiency of the laser diode/optical fiber coupling.

Advantageously, preferred clip 60 allows flexible alignment of optical fiber 18 with laser diode 82, allowing adjustments of the position and orientation of the end of the optical fiber in three dimensions relative to the laser diode. Preferably, the relationship between laser diode 82 and the end of optical fiber 18 is fixed after the laser diode is mounted and coupled to an energy source, allowing the relative positions of these elements to be verified.

Typically, sleeve 16 is secured about optical fiber 18 by first metalizing the optical fiber, and then soldering the sleeve in place, as is generally known in the art. The laser diode 82 is energized, and the microlens 92 at the end of optical fiber 18 is moved into alignment by manipulating the sleeve, with the position being verified by sensing the amount of energy propagating along the optical fiber to its opposite end. Optionally, sleeve 16 is then displaced from this aligned position, so that preferred clip 60 may be inserted. Sleeve 16 is then returned to the aligned position, with alignment verified by again energizing laser diode 82 and monitoring the propagated light energy. As both the bottom surface of preferred clip 60 and the mount surface 14 are planar, the clip will adapt horizontally to the aligned position of sleeve 16, and may also be horizontally repositioned along the mount surface to achieve realignment as necessary.

Furthermore, as channel 70 fittingly receives sleeve 16 anywhere within at least a vertical range R, preferred clip 60 may be firmly positioned against the mount surface 14, while also being affixable to sleeve 16 in its aligned position. Specifically, the engagement of sleeve 16 against a vertical wall surface of channel 70 allows the clip of the present invention to adapt to the vertical position of sleeve 16, and also accepts vertical movement of sleeve 16, as required to realign the end of the optical fiber with the laser diode.

Once alignment of the optical fiber and laser diode is verified, flanges 64 are affixed to the mount surface, typically with a laser welder. Such a laser welder will clearly have a power output which is order of magnitudes greater than that of the signal producing laser diode, typically having a maximum average power of about 50 W. Ideally an Nd:YAG laser, or the like, is used. Suitable lasers are available from NEC Corporation of Tokyo, Japan.

Once the clip is securely welded to the mount surface at an appropriate number of weld locations, the alignment of the optical fiber in the laser diode is again verified by energizing the laser. Once again, channel 70 allows vertical movement of sleeve 16 towards or away from mount surface 14 as required. Once proper alignment has been achieved, the clip is laser welded to the sleeve along the portion of walls 68 which are thinned by chamfers 72, preferably with at least 4 welds. Alignment is once again verified by energizing the laser diode, and package 90 is then sealed. As explained above, the laser welding operation allows the sleeve 16 to be very finely positioned with respect, and attached, to the clip.

While the description above provides a full and complete disclosure of the preferred embodiments of the present invention, various modifications, alternate constructions, and equivalents will be obvious to those with skill in the art. For example, alternative mechanisms could be used to attach the clip to the mount surface, or to affix the sleeve within the channel. Spot welding, soldering, and even adhesive bonding of these interfaces may be used in certain applications of the present invention. Thus, the scope of the present invention is limited solely by the appended claims.

What is claimed is:

1. A clip for supporting an end of an optical fiber relative to a mount surface, wherein a sleeve is disposed over the optical fiber adjacent the end, the clip comprising:

a clip body having a lower surface;

a flange disposed adjacent the lower surface of the body for affixing the lower surface of the body to the mount surface; and walls extending from the body to define a channel which fittingly receives the sleeve when a height of the fiber from the lower surface is anywhere within a predetermined range so that vertical alignment of the end of the optical fiber above the mount surface can be varied, wherein the channel is affixable about the sleeve so that the body rigidly couples the sleeve to the flange.

2. A fiberoptic support clip as claimed in claim 1, wherein the clip adjacent the channel is laser weldable to the sleeve.

3. A fiberoptic support clip as claimed in claim 2, wherein the walls are locally reduced in thickness adjacent a plurality of contact points between the sleeve and the channel to facilitate laser welding the sleeve to the clip.

4. A fiberoptic support clip as claimed in claim 1, wherein the lower surface of the body defines a plane to facilitate adjusting a horizontal orientation of the end of the optical fiber relative to the mount surface.

5. A fiberoptic support clip as claimed in claim 1, wherein the flange extends horizontally beyond the body on opposite sides of the channel, and wherein the opposite sides of the flange are laser weldable to the mount surface.

6. A fiberoptic support clip as claimed in claim 1, further comprising at least one weld affixing the sleeve within the channel of the clip, wherein an orientation of the end of the fiber relative to the flange prior to welding is substantially the same as the orientation of the fiber relative to the flange after welding.

7. A clip for supporting an end of an optical fiber relative to a planar mount surface, wherein a sleeve having a sleeve width is disposed over the optical fiber adjacent the end, the clip comprising a structure having a generally U-shaped cross-section including a channel that opens opposite a lower surface, the channel having parallel walls separated by a width corresponding to the sleeve width so that the channel fittingly receives the sleeve while the sleeve moves within the channel to vary a vertical alignment of the fiber above the lower surface, wherein the lower surface of the structure defines a plane so that a horizontal alignment of the end of the optical fiber can be adjusted by repositioning the plane of the lower surface against the mount surface, and wherein the structure adjacent the channel and adjacent the lower surface are adapted for laser welding to the sleeve and to the mount surface, respectively, to fix the vertical alignment of the end of the fiber and the horizontal alignment of the end of the fiber relative to the mount surface.

8. A fiberoptic end support comprising:

an optical fiber having an end;

a tubular sleeve disposed over the optical fiber adjacent the end;

a clip having a clip body with a lower surface, an upper surface, and walls extending upward from the upper surface of the body so as to define a channel which fittingly receives the sleeve when the sleeve is within at least a predetermined separation range from the lower surface to facilitate vertical alignment of the end of the optical fiber relative to the lower surface, wherein the sleeve is affixed within the channel; and a mount surface affixed to the lower surface of the clip body.

9. A fiberoptic end support as claimed in claim 8, wherein the sleeve is laser welded in the receptacle.

10. A fiberoptic end support as claimed in claim 9, wherein the clip comprises a flange adjacent the lower surface, and wherein the flange is laser welded to the mount surface.

11. A fiberoptic support clip as claimed in claim 8, wherein the lower surface of the clip and the mount surface are planar to facilitate horizontal alignment of the end of the optical fiber relative to the mount surface.

12. A fiberoptic support clip as claimed in claim 8, further comprising a laser diode mounted to the mount surface so that the clip maintains alignment between the end of the optical fiber and a laser output of the laser diode.

13. A fiberoptic support clip as claimed in claim 12, further comprising a microlens disposed at the end of the optical fiber so that light from the laser diode enters the optical fiber through the microlens.

14. A method for supporting an end of an optical fiber, the method comprising;

securing the optical fiber within a sleeve;

positioning the sleeve in a receptacle of a clip within a predetermined height range from a lower surface of a body of the clip, the receptacle fittingly receiving the sleeve throughout the height range;

restraining the positioned sleeve within the receptacle of the clip, the receptacle defined by walls which extend from the body of the clip; and affixing the lower surface of the clip to a planar mount surface so that the body of the clip rigidly couples the sleeve to the mount surface.

15. A method as claimed in claim 14, wherein the securing step comprises soldering a metalized portion of the optical fiber within the sleeve.

16. A method as claimed in claim 14, wherein the restraining step comprises laser welding the sleeve in the receptacle.

17. A method as claimed in claim 16, further comprising positioning the sleeve in the receptacle while welding.

18. A method as claimed in claim 17, wherein the welding step comprises heating at least one thinned portion of the clip adjacent a contact point of the clip with the sleeve.

19. A method as claimed in claim 14, wherein the affixing step comprises laser welding a flange of the clip to the mount surface.

20. A method as claimed in claim 14, further comprising forming a microlens at the end of the optical fiber.

21. A pigtailed module made with the method of claim 14.

22. A fiberoptic end support system comprising:

an optical fiber having an end;

a tubular sleeve disposed over the optical fiber adjacent the end, the sleeve having a sleeve diameter;

a clip having a clip body with a lower surface which defines a plane, a plurality of flanges which extend horizontally along the lower surface, an upper surface, and walls extending upward from the upper surface of the body so as to define a channel which has a width corresponding to the sleeve diameter so that the channel fittingly receives the sleeve when the sleeve is within at least a predetermined separation range from the lower surface to facilitate vertical alignment of the end of the optical fiber relative to the lower surface, the walls locally reduced in thickness adjacent a plurality of contact points between the sleeve and the channel, wherein the sleeve is affixed within the channel by a plurality of laser welds at the contact points; and a planar mount surface affixed against the plane of the lower surface of the clip body by a plurality of laser welds at the flanges.

23. A method for supporting an end of an optical fiber, the method comprising;

securing the optical fiber within a sleeve;

vertically positioning the sleeve in a receptacle of a clip anywhere within a predetermined height range from a lower surface of a body of the clip, the receptacle defined by walls which extend from the body of the clip away from the lower surface so as to fittingly receive the sleeve throughout the height range;

verifying vertical alignment of the vertically positioned sleeve by transmitting a light signal through the end of the optical fiber;

laser welding the vertically positioned sleeve within the receptacle of the clip;

horizontally positioning the sleeve by locating a plane of the lower surface of the clip against a planar mount surface while the sleeve is within the channel;

verify horizontal alignment of the sleeve by transmitting a light signal through the end of the optical fiber; and laser welding flanges of the clip to the mount surface.

* * * * *